United States Patent
Pirbhai

(10) Patent No.: US 7,580,359 B2
(45) Date of Patent: Aug. 25, 2009

(54) METHOD AND SYSTEM FOR MAXIMIZING NETWORK CAPACITY UTILIZATION IN MULTIPROTOCOL LABEL SWITCHED NETWORKS BY MOVING LABEL SWITCHED PATHS

(75) Inventor: Shafiq Pirbhai, Kanata (CA)

(73) Assignee: Alcatel Lucent, Paris (FR)

( * ) Notice: Subject to any disclaimer, the term of this patent is extended or adjusted under 35 U.S.C. 154(b) by 563 days.

(21) Appl. No.: 11/353,086

(22) Filed: Feb. 14, 2006

(65) Prior Publication Data

US 2007/0189170 A1 Aug. 16, 2007

(51) Int. Cl.
*H04L 1/00* (2006.01)
(52) U.S. Cl. .................. 370/237; 709/226
(58) Field of Classification Search .......... 370/229, 370/235, 237, 216, 217, 221, 225, 228, 236, 370/238, 241, 249, 351, 389, 395.1, 395.2, 370/395.21; 709/230, 232, 235, 223, 226; 379/1.01, 1.03, 1.04
See application file for complete search history.

(56) References Cited

U.S. PATENT DOCUMENTS

| | | | |
|---|---|---|---|
| 6,724,722 B1 * | 4/2004 | Wang et al. ............ | 370/229 |
| 6,768,718 B1 * | 7/2004 | Beshai et al. ........... | 370/237 |
| 6,901,053 B1 * | 5/2005 | Davies .................. | 370/237 |
| 6,956,821 B2 * | 10/2005 | Szviatovszki et al. ..... | 370/237 |
| 7,120,118 B2 * | 10/2006 | Rajagopal et al. ........ | 370/237 |
| 7,230,924 B2 * | 6/2007 | Chiu et al. .............. | 370/237 |
| 7,233,569 B1 * | 6/2007 | Swallow ................ | 370/225 |
| 7,283,477 B1 * | 10/2007 | Fedyk et al. ............ | 370/237 |
| 7,289,437 B2 * | 10/2007 | Chiruvolu .............. | 370/237 |
| 2003/0076840 A1 * | 4/2003 | Rajagopal et al. ...... | 370/395.21 |

FOREIGN PATENT DOCUMENTS

KR 2004-0028331 * 4/2004

* cited by examiner

*Primary Examiner*—Seema S Rao
*Assistant Examiner*—Khoa Huynh

(57) ABSTRACT

Various exemplary embodiments relate to a method including one or more of: transmitting a forward entity from the source node along forward links through the network toward the terminal node to determine links for the new path; upon encountering a node having insufficient capacity on a forward link exiting the node: determining whether the existing path has a reverse link entering the node; if so, transmitting the forward entity along the reverse link and then onward toward the terminal node to determine whether the existing path can be moved from the forward link and subsequent links to the terminal node to allow for the new path; and, if the existing path can be moved, moving the existing path from the forward, subsequent, and reverse links to create an updated path for the existing path and to allow the new path to assume the forward and subsequent links.

20 Claims, 7 Drawing Sheets

METHOD AND SYSTEM FOR MAXIMIZING NETWORK CAPACITY UTILIZATION IN MULTIPROTOCOL LABEL SWITCHED NETWORKS BY MOVING LABEL SWITCHED PATHS

FIELD OF THE INVENTION

This invention relates to the field of network management and service provisioning, and more specifically, to a method and system for maximizing network capacity unitization in multiprotocol label switched ("MPLS") networks by moving label switched paths ("LSPs") in the network.

BACKGROUND OF THE INVENTION

Multiprotocol Label Switching ("MPLS") provides a mechanism for engineering network traffic patterns that is independent of routing tables. MPLS assigns short labels to network packets that describe how to forward them through the network. MPLS is independent of any routing protocol. In a MPLS network, a node, switch or router which supports MPLS is generally known as a label switching router ("LSR") and a LSR at the edge (ingress or egress) of the MPLS network is generally known as a label edge router ("LER").

Now, as a data frame of a connectionless network layer protocol (e.g., the Internet Protocol ("IP")) travels from a source node to a destination node it travels from one node to the next through the network. Each node makes an independent forwarding decision for that packet. That is, each node analyzes the data frame's header to determine where to forward the packet next. The forwarding decision is determined by a forwarding table that is present on each node and that is built by network layer routing algorithms running on that node. Therefore each router independently chooses a next hop for the data frame, based on its analysis of the packet's header and the results of running the routing algorithm.

Frame headers contain considerably more information than is needed simply to choose the next hop along the path. Choosing the next hop can therefore be thought of as the composition of two functions. The first function partitions the entire set of possible packets into a set of forwarding equivalence classes ("FECs"). In conventional IP forwarding, the FEC is a subnet IP address prefix. Therefore a particular node will typically consider two packets to be in the same FEC if there is some address prefix "X" in that router's routing tables such that "X" is the "longest match" for each packet's destination address. The second maps each FEC to a next hop. Insofar as the forwarding decision is concerned, different packets which get mapped into the same FEC are indistinguishable. All data frames which belong to a particular FEC and which travel from a particular node will follow the same path (or if certain kinds of multi-path routing are in use, they will all follow one of a set of paths associated with the FEC). As the data frame traverses the network, each hop in turn re-examines the packet and matches it to a FEC in order to determine the next-hop.

In MPLS, the assignment of a particular data frame to a particular FEC is done just once, as the data frame enters the network. The FEC to which the packet is assigned is encoded as a short fixed length value known as a "label". When a packet is forwarded to its next hop, the label is sent along with it; that is, the packets are "labelled" before they are forwarded. At subsequent hops, there is no further analysis of the data frame's network layer header. Rather, the label in the frame header is used as an index into a table on the node. The table entry specifies the next hop, and a new label. The old label in the frame header is replaced with the new label, and the data frame is forwarded to its next hop. Thus, in the MPLS forwarding paradigm, once a packet is assigned to a FEC, no further network layer header analysis is done by subsequent routers; all forwarding is driven by the labels.

For reference, the MPLS header is made up of a stack of 32 bit labels. The MPLS "label" is 20 bits long and is the identifier that is locally significant to the LSR. The "experimental bits" field is 3 bits long and is used to determine the quality of service ("QoS") that is to be applied to the data frame. The "stack" field takes one bit and is used to determine whether there is another label stack entry in the header. And, the time-to-live ("TTL") field is 8 bits long and is similar to the TTL field carried in the IP header and is used to determine how many hops the frame can traverse before it is dropped. The IP frame is encapsulated in with an MPLS header at the ingress edge of the MPLS network. At the egress edge, the IP frame is restored by removing the MPLS header.

Label switched paths ("LSPs") are specific traffic paths though an MPLS network. They are similar to circuit switched paths such as those found in ATM or Frame Relay networks and their use can guarantee a specific level of performance. Packets are forwarded along a LSP where each LSR makes forwarding decisions based solely on the contents of the label. MPLS enables routers to make forwarding decisions based on the contents of the shortened MPLS label, rather than by performing a complex route lookup based on the destination network layer address.

Now, a provider that offers IP connectivity using a common MPLS backbone network sells services to hundreds of customers. Each customer at any given time has a known bandwidth requirement. Each physical link in the provider's backbone has a fixed bandwidth. Providing bandwidth over some links may be more expensive than over others (in the case where a provider leases bandwidth from another provider), or uses a more expensive media to provide connectivity. There are certain links that charge based on the minute (even if there is no traffic on this link at a given time) or by the mile, as opposed to other links that charge by the packet. As well, each link may have a different latency and reliability.

For each customer that requires connectivity between a pair of sites, a cost is incurred. This cost depends on the medium used to provide the service and the distance between the sites. As well, traffic that travels between these two sites incurs a latency and has a certain reliability. The latency is determined by the media used to provide the service, the number of hops between the sites, and the amount of time it takes for the data to be processed at each node along the path. Operators wish to arrange a minimum cost bandwidth usage pattern. For lower paying customers, operators may provide a service that maximizes the usage of the resources in the network while attempting to keep costs as low as possible with no latency and reliability guarantees. On the other hand, for higher paying customers, operators may provide a service with smaller latency and higher reliability at the least cost possible. Maximum flow and minimum cost problem algorithms are applied to MPLS networks to allow operators to offer higher paying customers guaranteed bandwidth, low latency and high reliability services.

Conventional IP systems use Interior Gateway Protocols ("IGPs") such as Intermediate System-Intermediate System ("IS-IS") and Open Shortest Path First ("OSPF"). Exterior Gateway Protocols ("EGPs") such as Border Gateway Protocol ("BGP") and Asynchronous Transfer Mode ("ATM") systems use the Private Network-Network Interface ("PNNI") to make independent routing decisions using a local instantiation of a synchronized routing area link state database. Route selection is typically based on shortest path computations using simple additive link metrics. One problem with these routing protocols is that they only consider the shortest path but do not consider the characteristics of the data traffic and network link latency and capacity constraints when making routing decisions. This results in some links of the network becoming congested, while other links along alternate paths remain underutilized. This also leads to the underutilization of network resources. In addition, data originating from sites of higher paying customers may not be treated any differently from data originating from other customer sites.

Thus, depending on what links are selected in the network when MPLS LSPs are provisioned, the network usage may not be optimal. This may result in prevention of provisioning of newer LSPs even though network capacity exists. One way to solve this problem is for the operator of the network to study the network and determine ways to reassign or move LSPs. Moving an LSP typically requires the complete tear down of the existing LSPs, creation of new LSPs, and recreation of previous LSPs using the selected routes through the network determined by the operator. However, this is time consuming and there is no guarantee that the operator will choose an optimal update for the network. Moreover, this task is difficult to perform for a network with a large number of LSPs.

A need therefore exists for an improved method and system for maximizing network capacity unitization in MPLS networks by moving LSPs in the network. Accordingly, a solution that addresses, at least in part, the above and other shortcomings is desired.

SUMMARY OF THE INVENTION

According to one aspect of the invention, there is provided a method for adding a new path between a source node and a terminal node in a network, the new path and an existing path traversing links between nodes in the network, the method comprising: transmitting a forward entity from the source node along forward links through the network toward the terminal node to determine links for the new path; and, upon encountering a node having insufficient capacity on a forward link exiting the node: determining whether the existing path has a reverse link entering the node; if so, transmitting the forward entity along the reverse link and then onward toward the terminal node to determine whether the existing path can be moved from the forward link and subsequent links to the terminal node to allow for the new path; and, if the existing path can be moved, moving the existing path from the forward, subsequent, and reverse links to create an updated path for the existing path and to allow the new path to assume the forward and subsequent links.

The method may further include transmitting a respective reverse entity from the terminal node to the source node over the links of each of the new and updated paths to establish each of the new and updated paths. The reverse entity may label the respective links of each the new and updated paths. The network may be a multiprotocol label switching ("MPLS") network, the paths may be label switched paths ("LSPs"), and the nodes may be routers. The forward and reverse entities may be forward and reverse messages, respectively. The forward and reverse messages may be resource reservation protocol ("RSVP") path ("PATH") and reservation request ("RESV") messages, respectively. The forward and reverse messages may be implemented by a static agent running on each of the nodes. The forward and reverse messages may be implemented by a static agent running on a central network management system ("NMS"). The forward and reverse entities may be forward and reverse mobile agents, respectively. And, an augmenting path algorithm such as the Ford-Fulkerson and/or Edmonds-Karp algorithm may be used to determine the links for the new and updated paths.

In accordance with further aspects of the present invention there is provided an apparatus such as a data processing system (e.g., a network management system, a network node, etc.), a method for adapting this system, as well as articles of manufacture such as a computer readable medium having program instructions recorded thereon for practicing the method of the invention.

BRIEF DESCRIPTION OF THE DRAWINGS

Features and advantages of the embodiments of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENTS

In the following description, details are set forth to provide an understanding of the invention. In some instances, certain software, circuits, structures and techniques have not been described or shown in detail in order not to obscure the invention. The term "data processing system" is used herein to refer to any machine for processing data, including the communication systems, computer systems, network devices, and network arrangements described herein. The present invention may be implemented in any computer programming language provided that the operating system of the data processing system provides the facilities that may support the requirements of the present invention. Any limitations presented would be a result of a particular type of operating system or computer programming language and would not be a limitation of the present invention.

Figure 1:
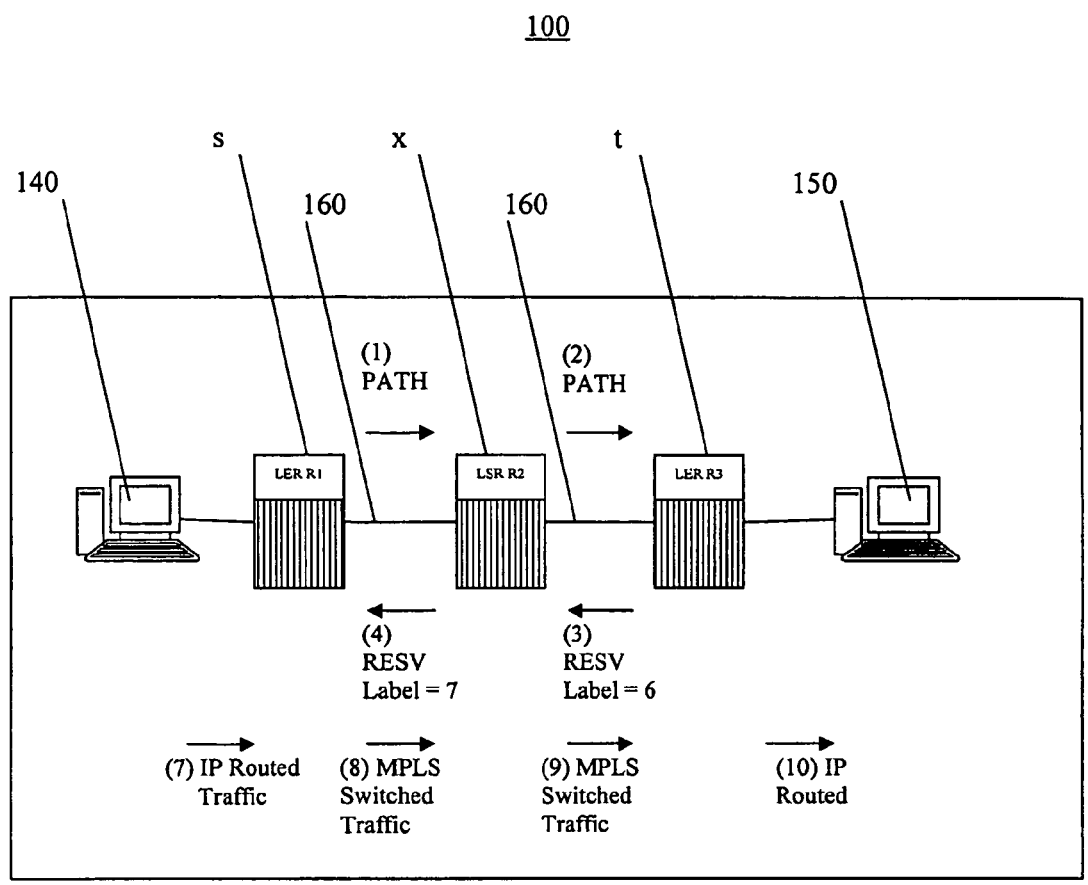
FIG. 1 is a block diagram illustrating a communications network adapted to implement an embodiment of the invention.

FIG. 1 is a block diagram illustrating an exemplary MPLS communications network 100 which may be adapted to implement an embodiment of the invention. The communications network 100 includes first and second customer systems 140, 150 coupled through respective source and terminal LERs s, t to a LSR x. Each router s, x, t may be coupled to a network management system ("NMS") 300, which will be described below, for routing configuration, etc. The first and second customer systems 140, 150 may be end customer systems, end customer local area networks ("LANs"), or end customer homes.

Now, the resource reservation protocol ("RSVP") is a network-control protocol that enables Internet applications to obtain differing QoS for their data flows. The addition of RSVP support to MPLS enables a LER s, t or a LSR x to classify packets by examining labels instead of IP headers to recognize packets that belong to a flow for which reservations have been made. RSVP is used to bind labels to reserved flows. FIG. 1 illustrates the process by which RSVP is used to reserve resources and allocate labels for a flow in a MPLS network 100. The RSVP "PATH" message is used by LER R1 s to tell LSR R2 x (step 1 in FIG. 1), and LSR R2 x to tell LER R3 t (step 2), to set up an LSP 160. When the LER R3 t reserves resources for the new flow, it allocates a label from its pool of free labels, and sends out a "RESV" message containing the label (step 3). Upon receipt of a RESV message with a label, LSR R2 x populates its forwarding table with this label as the outgoing label. LSR R2 x then reserves resources and allocates a new label and inserts it into a RESV message before sending it upstream to LER R1 s (step 4). If there are more LSRs x on the path to the source s, then this process repeats until the RESV message reaches the initiating LER s. LER R3 t allocates a label "6" for this reservation and advertises it upstream to its neighbour LSR R2 x. LSR R2 x allocates a label "7" for the same reservation and advertises it to LER R1 s. At this point a LSP 160 is setup for a flow from LER R1 s to LER R3 t. When an IP packet is received from the first customer system 140 through a customer port at LER R1 s (step 7), label "7" is "pushed" in front of the IP packet, and the resulting MPLS packet is sent to LSR R2 x (step 8). At LSR R2 x, the label "7" on the MPLS packet is "swapped" with the outgoing label "6", and the MPLS packet is forwarded to LER R3 t (step 9). At LER R3 t, the label "6" is "popped" from the MPLS frame, and the IP packet is forwarded out the customer port (step 10) to the second customer system 150.

An overview of RSVP is provided in the Internet Engineering Task Force ("IETF") request for comment ("RFC") document RFC 2205, "Resource Reservation Protocol (RSVP), Version 1, Functional Specification", September 1997, which is incorporated herein by reference. For reference, RSVP is a resource reservation setup protocol that is used by both network hosts and routers. Hosts use RSVP to request a specific QoS from the network for particular application flows. Routers use RSVP to deliver QoS requests to all routers along the data path. RSVP can also maintain and refresh states for a requested QoS application flow. RSVP treats an application flow as a simplex connection. That is, the QoS request travels only in one direction—from the sender to the receiver. RSVP is a transport layer protocol that uses IP as its network layer. However, RSVP does not transport application flows. Rather, it is more of an Internet control protocol, similar to the Internet Control Message Protocol ("ICMP") and Internet Group Management Protocol ("IGMP"). RSVP is not a routing protocol, but rather is designed to operate with current and future unicast and multicast routing protocols. The routing protocols are responsible for choosing the routes to use to forward packets, and RSVP consults local routing tables to obtain routes. RSVP only ensures the QoS of packets traveling along a data path. RSVP uses the following types of messages to establish and remove paths for data flows and to establish and remove reservation information: PATH, RESV (i.e., reservation request), PATH TEAR, and RESV TEAR.

With respect to PATH messages, each sender host transmits path messages downstream along the routes provided by the unicast and multicast routing protocols. Path messages follow the exact paths of application data, creating path states in the routers along the way, thus enabling routers to learn the previous-hop and next-hop node for the session. Path messages are sent periodically to refresh path states. With respect to RESV messages, each receiver host sends reservation request messages upstream toward senders and sender applications. RESV messages must follow exactly the reverse path of PATH messages. RESV messages create and maintain a reservation state in each router along the way. RESV messages are sent periodically to refresh reservation states. With respect to PATH TEAR messages, these messages remove (tear down) path states as well as dependent reservation states in any routers along a path. PATH TEAR messages follow the same path as PATH messages. A PATH TEAR typically is initiated by a sender application or by a router when its path state times out. PATH TEAR messages are not required, but they enhance network performance because they release network resources quickly. If PATH TEAR messages are lost or not generated, path states eventually time out when they are not refreshed, and the resources associated with the path are released. With respect to RESV TEAR messages, these messages remove reservation states along a path. These messages travel upstream toward senders of the session. In a sense, RESV TEAR messages are the reverse of RESV messages. RESV TEAR messages typically are initiated by a receiver application or by a router when its reservation state times out. RESV TEAR messages are not required, but they enhance network performance because they release network resources quickly. If RESV TEAR messages are lost or not generated, reservation states eventually time out when they are not refreshed, and the resources associated with the reservation are released.

Figure 2:
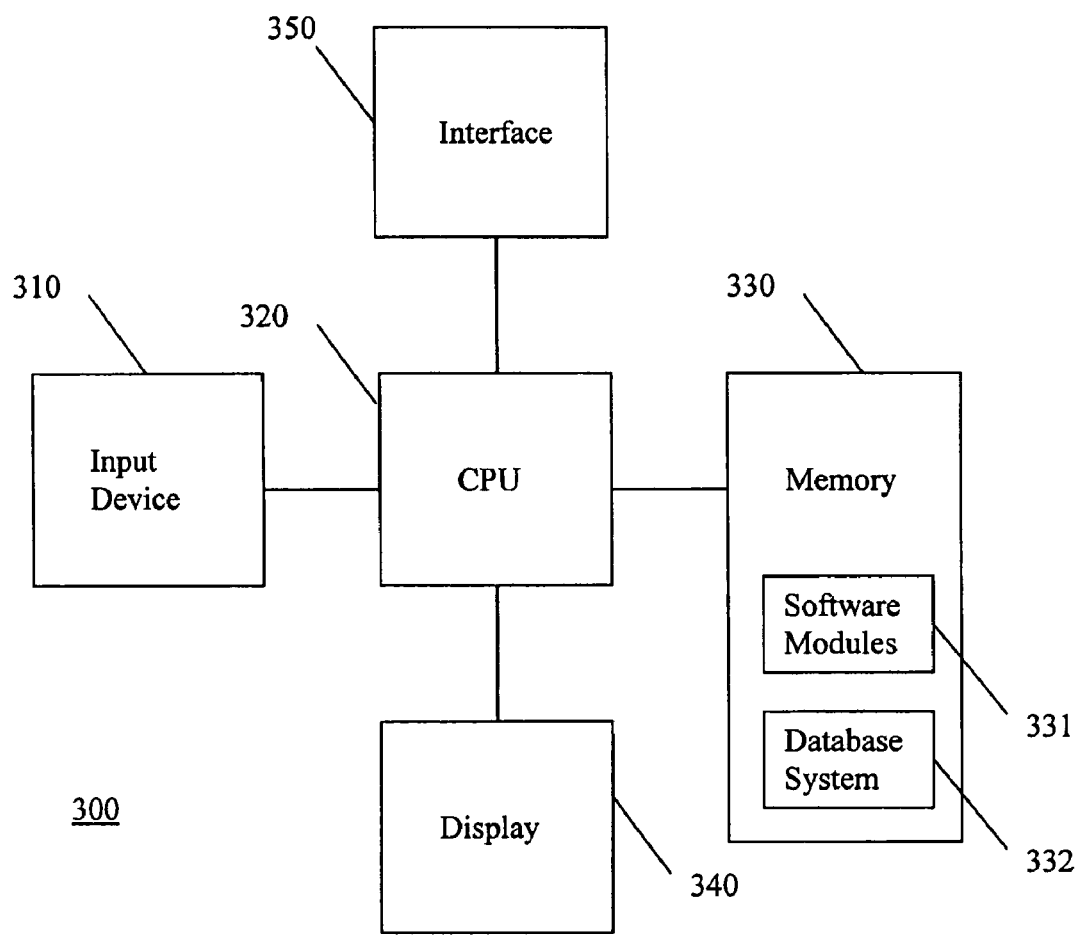
FIG. 2 is a block diagram illustrating a data processing system adapted to implement an embodiment of the invention.

FIG. 2 is a block diagram illustrating a data processing system 300 adapted to implement an embodiment of the invention. The data processing system 300 is suitable for operation as a NMS 300, router s, x, t, or other network device (e.g., switch, etc.). The data processing system 300 includes a central processing unit ("CPU") 320, memory 330, and an interface device 350 and may optionally include an input device 310 and a display 340. The CPU 320 may include dedicated coprocessors and memory devices. The memory 330 may include RAM, ROM, disk devices, and databases. The interface device 350 may include a network connection. The input device 310 may include a keyboard, a mouse, a trackball, or a similar device. And, the display 340 may include a computer screen, terminal device, or a hardcopy producing output device such as a printer or plotter. The data processing system 300 is adapted for communicating with other data processing systems (e.g., s, x, t) over a network 100 via the interface device 350. The data processing system 300 may include a database system 332 for storing and accessing network topology and programming information. The database system 332 may include a database management system ("DBMS") and a database and is stored in the memory 330 of the data processing system 300. The data processing system 300 has stored therein data representing sequences of instructions which when executed cause the method described herein to be performed. Of course, the data processing system 300 may contain additional software and hardware a description of which is not necessary for understanding the invention.

Thus, the data processing system 300 includes computer executable programmed instructions for directing the system 300 to implement the embodiments of the present invention. The programmed instructions may be embodied in one or more software modules 331 resident in the memory 330 of the data processing system 300. Alternatively, the programmed instructions may be embodied on a computer readable medium (such as a CD disk or floppy disk) which may be used for transporting the programmed instructions to the memory 330 of the data processing system 300. Alternatively, the programmed instructions may be embodied in a computer-readable, signal or signal-bearing medium that is uploaded to a network by a vendor or supplier of the programmed instructions, and this signal or signal-bearing medium may be downloaded through an interface (e.g., 350) to the data processing system 300 from the network by end users or potential buyers.

Now, the present invention addresses the problem of better utilizing available network capacity when MPLS LSPs 160 fail to route. According to the present invention, at each node where there is insufficient link capacity leaving the node to route the LSP, a determination is made as to whether LSPs passing through those nodes can be re-routed to other nodes, thereby creating sufficient link capacity leaving the node for the LSP in question. To do this, the use of the PATH message described above is extended to include reverse links (i.e., those entering a node) in finding a path for a LSP. In particular, the present invention includes two main steps as follows.

First, a path for the LSP 160 is found through the network 100. To do this, the invention extends the use of the PATH message. The existing PATH message in the RSVP network-control protocol can only find a path if there is capacity available on links that leave a network node. The invention allows for the use of links that have LSPs coming into the network node. These links will be referred to as "reverse links" in the following.

Second, if a path is found through the network 100, and no reverse links are in the path then the existing RESV message would work. However, if reverse links are used in the path then existing LSPs must be updated. This is accomplished by moving one or more LSPs on the reverse links along the path.

Thus, the present invention provides for the automatic moving of LSPs in a network to allow more LSPs to be provisioned. With respect to searching for available network capacity in a MPLS network, traditionally and as described above, a PATH message (from source node to destination node) and a RESV message (from destination node back to the source node) are used. The PATH message would normally traverse a link that has capacity for the LSP. In order to look for additional capacity, the present invention provides for the PATH message to traverse links that have LSPs coming into the node.

Figure 3:
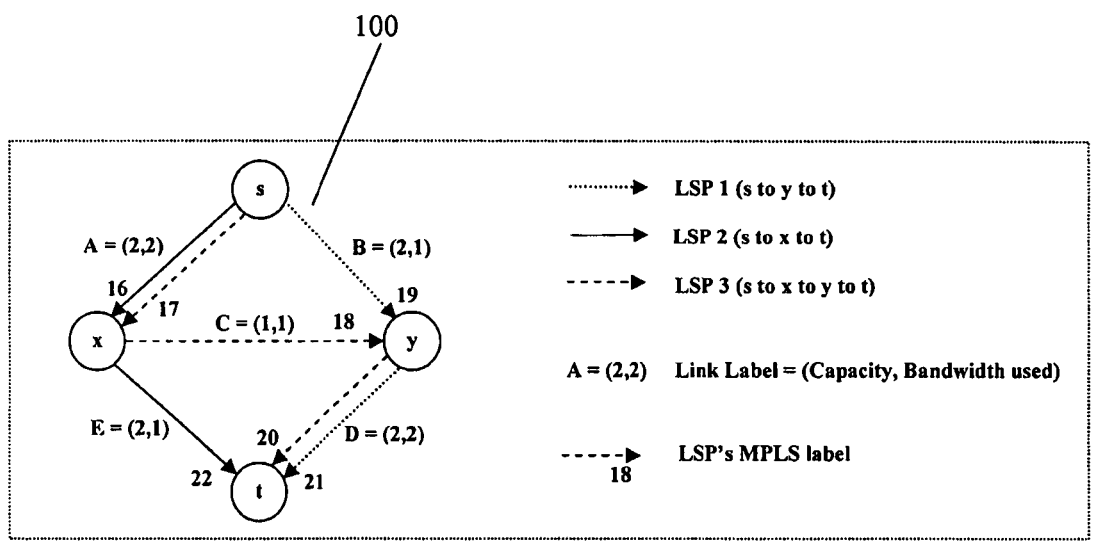
FIG. 3 is a schematic diagram illustrating the initial configuration of a MPLS network prior to the addition of a new or augmenting LSP in accordance with an embodiment of the invention.
Figure 4:
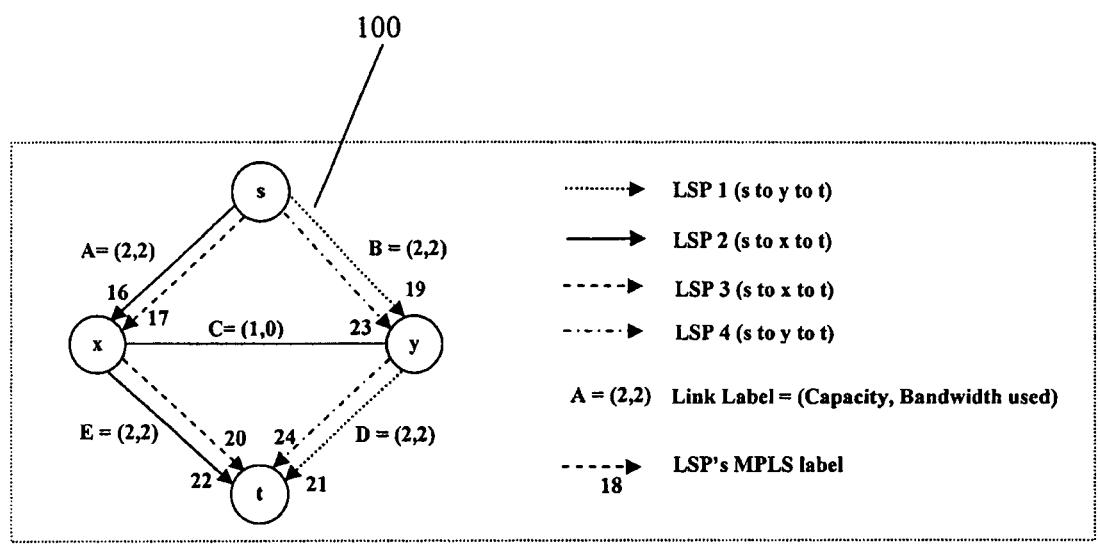
FIG. 4 is a schematic diagram illustrating the final configuration of the MPLS network of FIG. 3 after the addition of the new or augmenting LSP in accordance with an embodiment of the invention.

FIG. 3 is a schematic diagram illustrating the initial configuration of a MPLS network prior to the addition of a new or augmenting LSP in accordance with an embodiment of the invention. And, FIG. 4 is a schematic diagram illustrating the final configuration of the MPLS network of FIG. 3 after the addition of the new or augmenting LSP in accordance with an embodiment of the invention. In FIGS. 3 and 4, the MPLS network 100 has four nodes s, t, x, y (e.g., routers, switches, etc.) and five links A (between nodes s and x), B (between nodes s and y), C (between nodes x and y), D (between nodes y and t), E (between nodes x and t). Each link A, B, C, D, E has an associated capacity and bandwidth used. For example, link A in FIG. 3 has a capacity of 2 and a bandwidth used of 2 (designated as A=(2, 2)). In addition, the network 100 of FIG. 3 has three LSPs as follows: LSP 1 from nodes s to y (MPLS label 19) to t (MPLS label 21), LSP 2 from nodes s to x (MPLS label 16) to t (MPLS label 22), and LSP 3 from nodes s to x (MPLS label 17) to y (MPLS label 18) to t (MPLS label 20). As will be described in the following, FIG. 4 shows a modification of LSP 3 from nodes s to x (MPLS label 17) to t (MPLS label 20) to allow for the addition of new LSP 4 from nodes s to y (MPLS label 23) to t (MPLS label 24).

Thus, the initial MPLS network 100 of FIG. 3 has 4 nodes s, t, x, y. There are 3 LSPs (i.e., LSP 1, LSP 2, LSP 3) that originate from node s and terminate at node t. Each of these LSPs provides connectivity between customer systems or networks. For example, LSP 1 may provide connectivity between the first and second customer systems 140, 150 shown in FIG. 1. These customer systems 140, 150 are connected to the provider's network 100 at a port on node s and a port on node t, respectively. The capacity of each link A, B, C, D, E and the amount of bandwidth used is shown in brackets. For illustration purposes, each of the three LSPs uses one unit of bandwidth, noting that in a real network setting it can be up to the link capacity. Packets destined to node t from node s may take one of the three LSPs based on the QoS the packet requires. For example if a packet from the first customer system 140 were to take LSP 3, it would travel from node s to node x over link A with label 17, from node x to node y over link C with label 18, and from node y to node t over link D with label 20, and finally out a port on node t to the second customer system 150.

Suppose now that a new LSP (i.e., LSP 4) is to be created of one unit of bandwidth between the first and second customers 140, 150. The LSP is required to connect an incoming port on node s to an outgoing port on node t. From FIG. 3, it can be seen that this would require augmenting the paths through the network. Notice that augmenting the paths to create LSP 4 in the network 100 requires the updating of LSP 3, but leaves LSP 1 and LSP 2 untouched because the flow cannot be augmented over certain links. FIG. 4 shows the same network 100 after LSP 4 has been created and LSP 3 has been updated. From FIG. 4, it may be observed that a packet from the first customer system 140 traveling through LSP 3 would travel from node s to node x over link A with label 17, and from node x to node t over link E with label 20. A packet from the same customer system 140 (or multiple customer systems or networks connected to node s) traveling through LSP 4 would travel from node s to node y over link B with label 23, and from node y to node t with label 24.

In FIG. 3, the PATH message for setting up a new LSP 4 travels from source node s to node y over link B. At node y, there is no additional capacity on link D (i.e., D=(2, 2)) between nodes y and t. In prior methods, the setup of new LSP 4 would fail at this point as the PATH message cannot progress further as there is no additional capacity on forward link D. However, with the present invention this is not so as the PATH message is adapted to traverse link C to node x over the reverse link as there is an existing LSP (i.e., LSP 3) that traverses from node x to y. The PATH message then traverses from node x to node t as there is available capacity on that link (i.e., link E=(2, 1)). At this point, it has been determined that in order to create new LSP 4, LSP 3 needs to be moved from between nodes y and t to between nodes x and t. Now, with respect to creating new LSP 4, the RESV message traverses from node t to node y and from node y to node s, allocating labels (i.e., 24 and 23, respectively) and FECs for new LSP 4. Next, with respect to updating LSP 3, the RESV message travels from node t to node x, allocating and updating the labels (i.e., link E in LSP 3 now has label 20 in FIG. 4) and FECs for the new path of LSP 3, and then on to node y in order to tear down the old configuration of LSP 3. Note that if there were any nodes between nodes t and y, the LSP 3 FECs would need to be removed also. FIG. 4 shows the network 100 after LSP 4 has been created and LSP 3 has been updated.

The new or augmenting path may be found from the source node s to destination node t using techniques such as the Ford-Fulkerson algorithm (L. R. Ford, Jr. and D. R Fulkerson, "Flows in Networks", Princeton University Press, Princeton, N.J., 1962) and/or the Edmonds-Karp algorithm (J. Edmonds and R. M. Karp, "Theoretical Improvements in Algorithmic Efficiency for Network Flow Problems", Journal of the ACM, Vol. 19, pp. 248-264, 1972), both of which are incorporated herein by reference, that have been adapted to operate in accordance with the present invention. These algorithms have a forward routine ("Routine A") and a reverse routine ("Routine B"). The forward routine is used to find the optimal augmenting path to a destination. The reverse routine uses the information gathered by the forward routine to implement the optimal augmenting path and update the network. Thus, Routine A implements the functionality of the PATH message while Routine B implements the functionality of the RESV message.

According to one embodiment, a message based method may be used to establish the new LSP by sending a message based implementation of Routine A from node s to node t (through nodes y and x) and a message based implementation of Routine B from node t to node s (through nodes x and y). In particular, once node s has determined that it has to reroute LSP 3 before LSP 4 can find available network resources, it sends a "PATH TEAR" message from node s through nodes x and y to node t. When node t receives the "PATH TEAR" message, it sends a "RESV TEAR" message through nodes y and x to node s. When node s receives the "RESV TEAR" message, it can now set up LSP 3 along a new path, and set up the new LSP 4. To setup LSP 3, node s sends a "PATH" message through node x to node t. Once node t receives the "PATH" message it sends a "RESV" message through node x to node s. To setup LSP 4, node s sends a "PATH" message through node y to node t. Once node t receives the "PATH" message it sends a "RESV" message through node y to node s.

In this message based method, a static agent (e.g., software modules 331) implementing Routines A and B is run on each and every node s, t, x, y in the network 100. This approach requires messaging between the nodes s, t, x, y in the network 100, that every node use the same algorithm, and hence the same software to accomplish this task. Note that in this approach the software on each node s, t, x, y must be maintained individually.

According to another embodiment, a static agent (e.g., software modules 331) implementing Routines A and B is run by a centralized NMS 300 that keeps tracks of the nodes s, t, x, y links between the nodes, their maximum capacities and utilization at a any given time. Resource optimization would be performed by the NMS 300 and the update to the network resources would require messaging between the NMS 300 and the various nodes s, t, x, y on the network 100. Note that in this approach the centralized NMS 300 represents a single point of failure.

According to another embodiment, mobile agents (e.g., mobile code or software modules 331) implementing Routines A and B is run by each node s, t, x, y in the network 100. In this embodiment, the exchange of link utilization information and the process of optimizing network resource usage is moved from the nodes s, t, x, y or NMS 300 to mobile agents. A forward mobile agent implements Routine A while a reverse mobile agent implements Routine B. The forward agent starts at a source node s and follows a certain path collecting information along the way. When the agent reaches the destination node t, it spawns one or more reverse agents, transfers its information to the new (reverse) agents, and dies. The reverse agents follow reverse paths back towards the source node. Along its path, each backward agent uses the information it received from the forward agent to update the nodes. Hence in this approach, improving resource usage is manifested in the movement of agents that carry the residual capacity information from one node to another rather than by the propagation of messages that carry this information. The algorithm used to search for an augmenting path can be changed at any given time by using a different instance of a mobile agent. One instance of the agent could search for an augmenting path using the least links with the least cost, whereas another instance of an agent could search for an augmenting path using least network latency, and another using random links. An agent could also use a combination of these factors in determining which link to pick. This allows service providers to introduce new versions of the algorithm at any given time without affecting their networks and the services they provide to their customers.

Advantageously, the present invention allows better use of network resources and allows service providers to create more LSPs in a given network.

Figure 5:
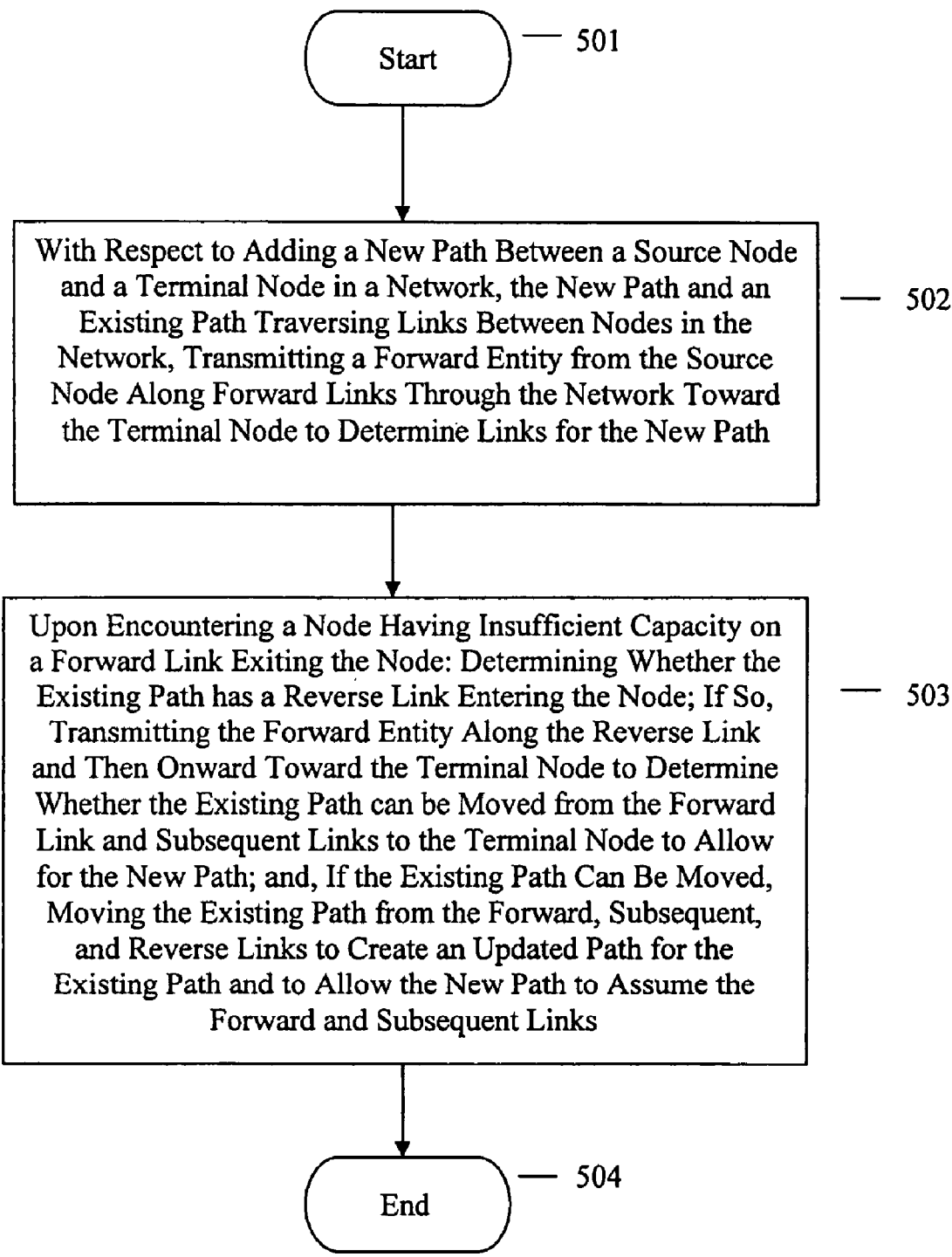
FIG. 5 is a flow chart illustrating operations of software modules within the memory of a data processing system for adding a new path between a source node and a terminal node in a network, the new path and an existing path traversing links between nodes in the network, in accordance with an embodiment of the invention.

The above described method may be summarized with the aid of a flowchart. FIG. 5 is a flow chart illustrating operations 500 of software modules 331 within the memory 330 of a data processing system 300 for adding a new path (e.g., LSP 4 in FIG. 4) between a source node s and a terminal node t in a network 100, the new path LSP 4 and an existing path (e.g., LSP 3 in FIG. 3) traversing links A, B, C, D, E between nodes s, t, x, y in the network 100, in accordance with an embodiment of the invention.

At step 501, the operations 500 start.

At step 502, a forward entity is transmitted from the source node s along forward links (e.g., B in FIG. 3) through the network 100 toward the terminal node t to determine links (e.g., B, D) for the new path LSP 4.

At step 503, upon encountering a node y having insufficient capacity on a forward link D exiting the node y: a determination is made as to whether the existing path LSP 3 has a reverse link C entering the node y; if so, the forward entity is transmitted along the reverse link C and then onward (e.g., over link E in FIG. 3) toward the terminal node t to determine whether the existing path LSP 3 can be moved from the forward link D and subsequent links (none shown in FIG. 3) to the terminal node t to allow for the new path LSP 4; and, if the existing path LSP 3 can be moved, the existing path LSP 3 is moved from the forward D, subsequent, and reverse links C to create an updated path LSP 3 (i.e., as shown in FIG. 4) for the existing path LSP 3 (i.e., as shown in FIG. 3) and to allow the new path LSP 4 to assume the forward D and subsequent links.

At step 504, the operations 500 end.

The method may further include transmitting a respective reverse entity from the terminal node t to the source node s over the links of each of the new LSP 4 and updated paths LSP 3 (i.e., as shown in FIG. 4) to establish each of the new and updated paths. The reverse entity may label the respective links of each the new LSP 4 and updated paths LSP 3. The network 100 may be a multiprotocol label switching ("MPLS") network 100, the paths may be label switched paths ("LSPs"), and the nodes s, t, x, y may be routers. The forward and reverse entities may be forward and reverse messages, respectively. The forward and reverse messages may be resource reservation protocol ("RSVP") path ("PATH") and reservation request ("RESV") messages, respectively. The forward and reverse messages may be implemented by a static agent running on each of the nodes s, t, x, y. The forward and reverse messages may be implemented by a static agent running on a central network management system ("NMS") 300. The forward and reverse entities may be forward and reverse mobile agents, respectively. And, an augmenting path algorithm such as the Ford-Fulkerson and/or Edmonds-Karp algorithm may be used to determine the links B, D for the new and updated paths.

Figure 6:
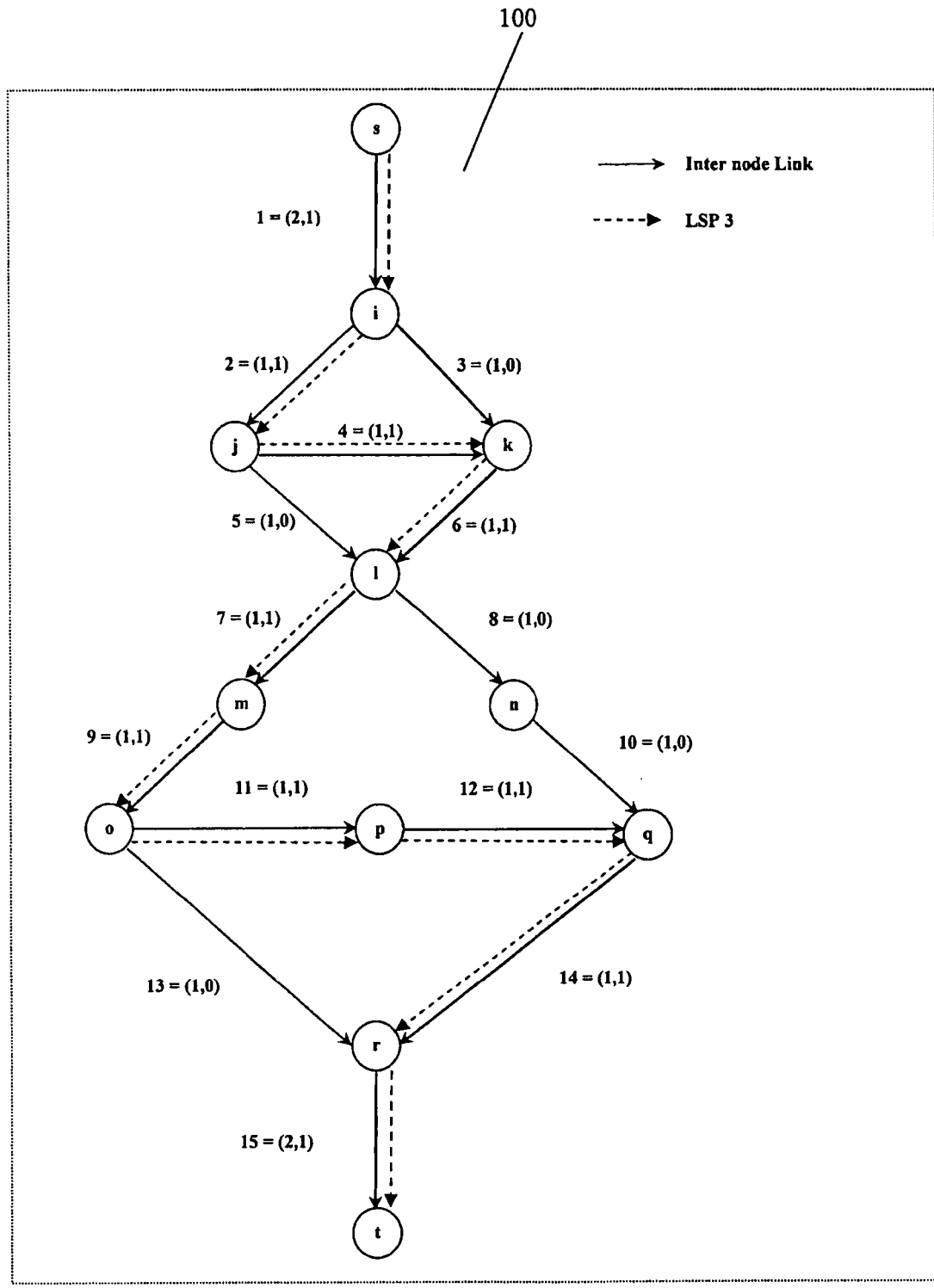
FIG. 6 is a schematic diagram illustrating the initial configuration of a MPLS network prior to the addition of a new or augmenting LSP in accordance with an embodiment of the invention; and, FIG. 7 is a schematic diagram illustrating the final configuration of the MPLS network of FIG. 6 after the addition of the new or augmenting LSP in accordance with an embodiment of the invention.
Figure 7:
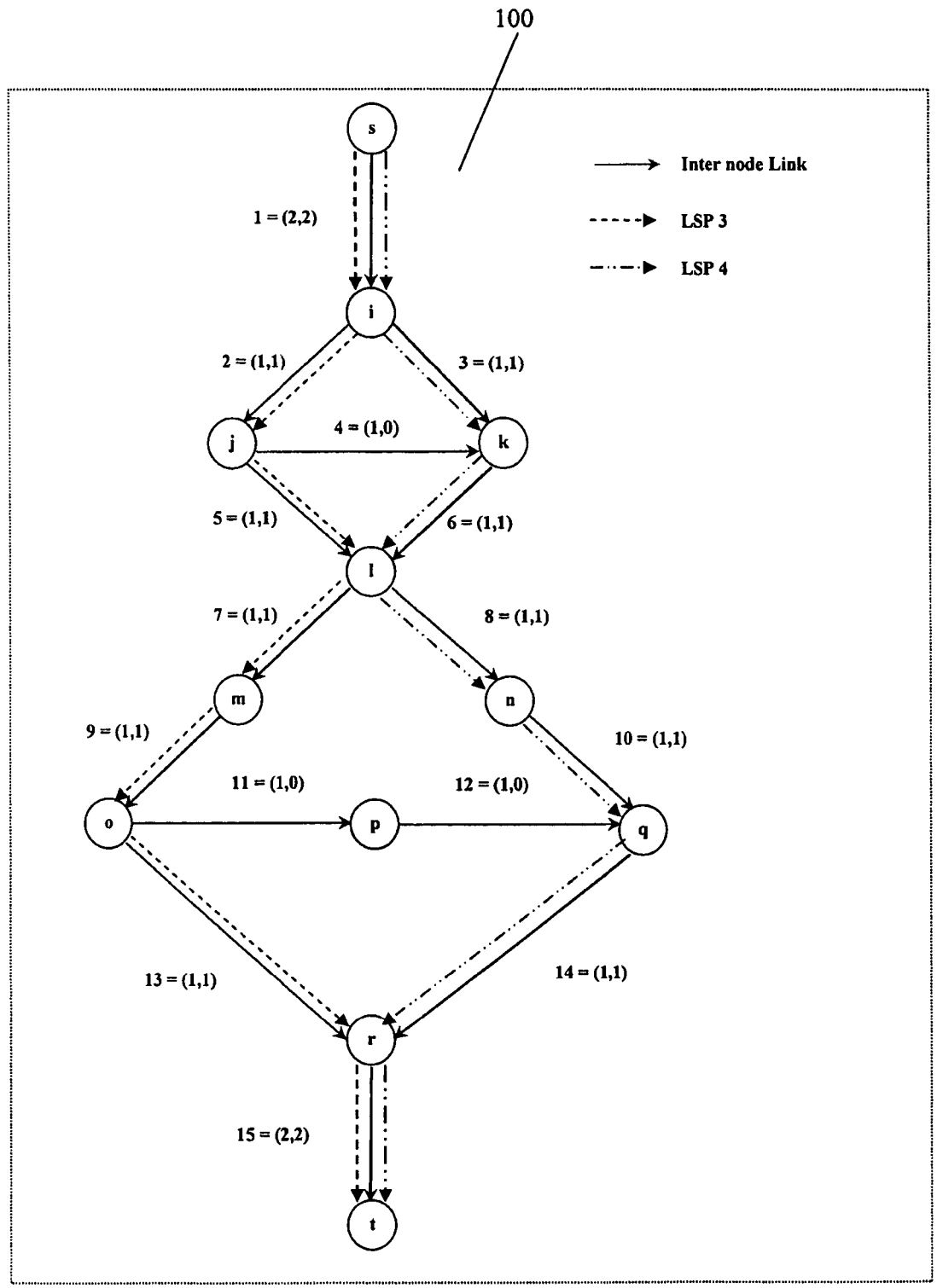

The method of the present invention may be illustrated with a further example as shown in FIGS. 6 and 7. FIG. 6 is a schematic diagram illustrating the initial configuration of a MPLS network prior to the addition of a new or augmenting LSP in accordance with an embodiment of the invention. And, FIG. 7 is a schematic diagram illustrating the final configuration of the MPLS network of FIG. 6 after the addition of the new or augmenting LSP in accordance with an embodiment of the invention. In FIGS. 6 and 7, the MPLS network 100 has twelve nodes s, t, i, j, k, l, m, n, 0, p, q, r (e.g., routers, switches, etc.) and fifteen links 1-15. Each link 1-15 has an associated capacity and bandwidth used.

In the network 100 of FIG. 6, there is one existing LSP (i.e., LSP 3). As before, the goal is to create a new LSP (i.e., LSP 4) from node s to node t. In this example, the PATH message travels from source s to node i over link 1, and from node i to node k over link 3. At node k there is no additional capacity on link 6. Without the present invention, the LSP setup would fail at this point. However, with the present invention, the PATH message can traverse link 4 to node j since there is an existing LSP that traverses from node j to node k. The PATH message can traverse from node j to node 1, from node 1 to node n, and from node n to node q because there is available capacity. Once again, link 14 does not have any capacity. So, the PATH message travels from node q to node p (i.e., because there is an existing LSP from node p to node q), and from node p to node o (i.e., because there is an existing LSP from node o to node p). The PATH message can traverse from node o to node r, and from node r to node t (i.e., because there is available capacity).

With respect to the creation of LSP 4, at this point it is known that in order to create LSP 4, LSP 3 needs to be moved between nodes j and k and between node o and q. Thus, the RESV message traverses from node t to node r, from node r to node q, from node q to node n, from node n to node l, from node l to node k, from node k to node i, and finally from node i to node s, allocating labels and FECs for LSP 4. In addition, between nodes r and q (but not including node r) and between nodes l and k (but not including node l), FECs for LSP 3 are removed.

With respect to the updating of LSP 3, the RESV message travels from node t to node r. At node r, the FEC for LSP 3 is updated. The RESV message then travels from node r to node o. At node o, the FEC for LSP 3 is updated. The RESV message then travels from node o to node p. At node p, the FEC for LSP 3 is removed. The RESV message then travels from node p to node q, from node q to node n, from node n to node l (no updates done at these nodes). At node l, the FEC for LSP 3 is updated. Then the RESV message travels from node l to node k, etc. FIG. 7 shows the network 100 after LSP 4 has been created and LSP 3 has been updated.

While this invention is primarily discussed as a method, a person of ordinary skill in the art will understand that the apparatus discussed above with reference to a data processing system 300, may be programmed to enable the practice of the method of the invention. Moreover, an article of manufacture for use with a data processing system 300, such as a prerecorded storage device or other similar computer readable medium including program instructions recorded thereon, may direct the data processing system 300 to facilitate the practice of the method of the invention. It is understood that such apparatus and articles of manufacture also come within the scope of the invention.

In particular, the sequences of instructions which when executed cause the method described herein to be performed by the data processing system 300 of FIG. 2 can be contained in a data carrier product according to one embodiment of the invention. This data carrier product can be loaded into and run by the data processing system 300 of FIG. 2. In addition, the sequences of instructions which when executed cause the method described herein to be performed by the data processing system 300 of FIG. 2 can be contained in a computer software product according to one embodiment of the invention. This computer software product can be loaded into and run by the data processing system 300 of FIG. 2. Moreover, the sequences of instructions which when executed cause the method described herein to be performed by the data processing system 300 of FIG. 2 can be contained in an integrated circuit product including a coprocessor or memory according to one embodiment of the invention. This integrated circuit product can be installed in the data processing system 300 of FIG. 2.

The embodiments of the invention described above are intended to be exemplary only. Those skilled in this art will understand that various modifications of detail may be made to these embodiments, all of which come within the scope of the invention.

What is claimed is:

1. A method for adding a new path and converting an existing path into an updated path, the new path, the existing path, and the updated path traversing links from a source node toward a terminal node in a network, the method comprising:

transmitting a forward entity from the source node along forward links through the network from the source node toward the terminal node to determine links for the new path;

when the forward entity encounters a node having insufficient capacity on a forward link exiting the node, the forward link sending data downstream toward the terminal node, determining whether the existing path has at least one reverse link entering the node, wherein the at least one reverse link has at least one Label Switched Path (LSP) coming into the node, the at least one LSP sending data front the source node to the terminal node;

when the existing path has at least one reverse link entering the node, transmitting the forward entity backward along the at least one reverse link toward the source node until the forward entity encounters a node having sufficient capacity on a forward link exiting the node;

transmitting the forward entity on the forward link having sufficient capacity to the terminal node;

determining whether the existing path can be moved from the forward link having insufficient capacity to include the forward link having sufficient capacity;

when the existing path can be moved, moving LSP corresponding to the existing path from the at least one reverse link to create an updated path for the existing path, the updated path using the forward link having sufficient capacity, thereby converting the forward link having insufficient capacity into a forward link having newly available capacity for use by the new path; and creating the new path including the forward link having newly available capacity.

2. The method of claim 1, further comprising:
transmitting a respective reverse entity from the terminal node to the source node over the links of each of the new and the updated paths to establish each of the new and the updated paths.

3. The method of claim 2, further comprising:
using the reverse entity to label the respective links of each of the new and the updated paths.

4. The method of claim 3,
wherein the network is a multiprotocol label switching ("MPLS") network, and
the nodes are routers.

5. The method of claim 4,
wherein the forward and reverse entities are forward and reverse messages, respectively.

6. The method of claim 5,
wherein the forward and reverse messages are resource reservation protocol ("RSVP") path ("PATH") and reservation request ("RESV") messages, respectively.

7. The method of claim 5, further comprising:
implementing the forward and the reverse messages with a static agent running on each of the nodes.

8. The method of claim 5, further comprising:
implementing the forward and the reverse messages with a static agent running on a central network management system ("NMS").

9. The method of claim 4,
wherein the forward and reverse entities are forward and reverse mobile agents, respectively.

10. The method of claim 1, further comprising:
using an augmenting path algorithm to determine the links for the new and the updated paths.

11. A system that adds a new path and converts an existing path into an updated path, the new path, the existing path, and the updated path traversing links from a source node toward a terminal node in a network, the system comprising:
a processor coupled to the wireless network; and
a program executed by the processor, the program including:
a module that transmits a forward entity from the source node along forward links through the network from the source node toward the terminal node to determine links for the new path; and,
a module that, when the forward entity encounters a node having insufficient capacity on a forward link exiting the node, the forward link sending data downstream from the source node toward the terminal node:
determines whether the existing path has at least one reverse link entering the node wherein the at least one reverse link has at least one Label Switched Path (LSP) coming into the node, the at least one LSP sending data from the source node to the terminal node;
after identifying the at least one reverse link,
transmits the forward entity backward along the reverse link toward the source node until the forward entity encounters a node having sufficient capacity on a forward link existing the node;
transmits the forward entity on the forward link having sufficient capacity to the terminal node;
determines whether the existing path can be moved from the forward link having insufficient capacity to the forward link having sufficient capacity;
when the existing path can be moved, moves a LSP corresponding to the existing path from the at least one reverse link to create an updated path for the existing path, the updated path using the forward link having sufficient capacity, thereby converting the forward link having insufficient capacity into a forward link having newly available capacity for use by the new path, and
creates the new path using the forward link having newly available capacity.

12. The system of claim 11, further comprising:
a module that transmits a respective reverse entity from the terminal node to the source node over the links of each of the new and the updated paths to establish each of the new and the updated paths.

13. The system of claim 12,
wherein the reverse entity labels the respective links of each of the new and the updated paths.

14. The system of claim 13,
wherein the network is a multiprotocol label switching ("MPLS") network, and the nodes are routers.

15. The system of claim 14,
wherein the forward and reverse entities are forward and reverse messages, respectively.

16. The system of claim 15,
wherein the forward and reverse messages are resource reservation protocol ("RSVP") path ("PATH") and reservation request ("RESV") messages, respectively.

17. The system of claim 15,
wherein the forward and reverse messages are implemented by a static agent running on each of the nodes.

18. The system of claim 15,
wherein the forward and reverse messages are implemented by a static agent running on a central network management system ("NMS").

19. The system of claim 14,
wherein the forward and reverse entities are forward and reverse mobile agents, respectively.

20. The system of claim 11,
wherein an augmenting path algorithm is used to determine the links for the new and the updated paths.

* * * * *

UNITED STATES PATENT AND TRADEMARK OFFICE
CERTIFICATE OF CORRECTION

PATENT NO. : 7,580,359 B2  Page 1 of 1
APPLICATION NO. : 11/353086
DATED : August 25, 2009
INVENTOR(S) : Shafiq Pirbhai It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 755 days.

Signed and Sealed this

Fourteenth Day of September, 2010

David J. Kappos
*Director of the United States Patent and Trademark Office*